(12) United States Patent
Endo et al.

(10) Patent No.: US 7,382,105 B2
(45) Date of Patent: Jun. 3, 2008

(54) MOTOR DRIVING DEVICE AND ELECTRIC POWER STEERING APPARATUS

(75) Inventors: Shuji Endo, Gunma (JP); Masahide Saito, Gunma (JP); Kenji Mori, Gunma (JP); Lilit Kovudhikulrungsri, Gunma (JP); Toru Sakaguchi, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 30 days.

(21) Appl. No.: 10/583,042

(22) PCT Filed: Dec. 2, 2004

(86) PCT No.: PCT/JP2004/018327

§ 371 (c)(1),
(2), (4) Date: Jun. 15, 2006

(87) PCT Pub. No.: WO2005/057775

PCT Pub. Date: Jun. 23, 2005

(65) Prior Publication Data

US 2007/0081799 A1   Apr. 12, 2007

(30) Foreign Application Priority Data

Dec. 15, 2003   (JP) ............................. 2003-416182

(51) Int. Cl.
*H02P 7/29* (2006.01)
(52) U.S. Cl. ..................... 318/432; 318/430; 388/811
(58) Field of Classification Search ........ 318/430–434, 318/609, 610, 603, 599; 388/811; 710/4; 711/202; 712/200; 718/100; 370/232
See application file for complete search history.

(56) References Cited

U.S. PATENT DOCUMENTS 5,023,535 A * 6/1991 Miller et al. ................ 318/599
5,365,385 A * 11/1994 Hargarten et al. ........ 360/73.03
5,617,574 A * 4/1997 Boutaud et al. ............ 712/200
5,764,017 A * 6/1998 Bauck ......................... 318/610
5,829,054 A * 10/1998 Ehlig et al. ................. 711/202
5,935,176 A * 8/1999 Nielson .......................... 701/4
6,134,578 A * 10/2000 Ehlig et al. ................. 718/100
6,153,998 A * 11/2000 Takakura ..................... 318/560
6,704,160 B2 * 3/2004 Takakura .................. 360/78.09
2003/0076616 A1 * 4/2003 Hsin ........................ 360/78.09

(Continued)

FOREIGN PATENT DOCUMENTS

EP   1696551 A1 * 8/2006

(Continued)

Primary Examiner—Paul Ip
(74) Attorney, Agent, or Firm—Sughrue Mion, PLLC

(57) ABSTRACT

In a motor driving device where a motor having a winding wire with small inductance value is driven by a digital control means comprised of control means including a current command value calculating means, a current control means and a PWM control means whose sampling periods are different from each other, when discrete signals sampled by the respective control means are zero-order-held, a motor current includes a lot of higher harmonic waves due to a quantization error, thereby increasing a motor noise.

When an n-th-order hold means is provided between the respective control means with different sampling periods, the quantization error can be reduced remarkably, and thus the higher harmonic wave components included in the motor current are reduced, thereby greatly reducing the motor noise.

18 Claims, 10 Drawing Sheets

U.S. PATENT DOCUMENTS

2005/0141422 A1\* 6/2005 Roach et al. ............... 370/232

FOREIGN PATENT DOCUMENTS

| JP | 6-276097 A | 9/1994 |
| --- | --- | --- |
| JP | 11-18469 A | 1/1999 |
| JP | 2000-18069 A | 1/2000 |
| JP | 2000135983 A \* | 5/2000 |
| JP | 2000-184773 A | 6/2000 |

\* cited by examiner

PRIOR ART

PRIOR ART

INTERPOLATION VALUE (indicated by ○) IS
OBTAINED BY USING THREE POINTS (indicated by ●)

FIG.11
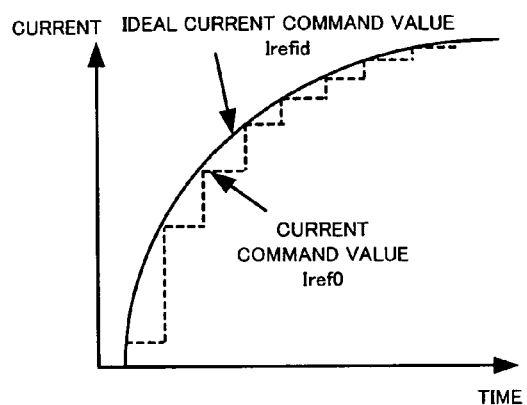
(A)
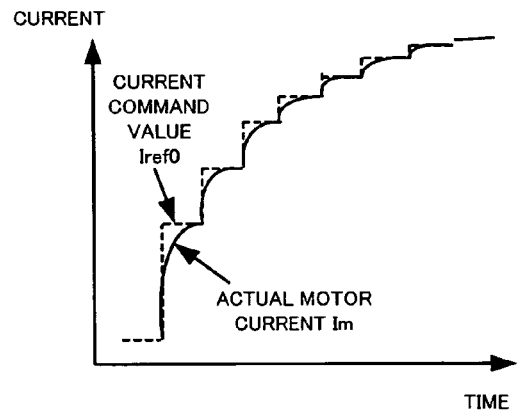
(B)
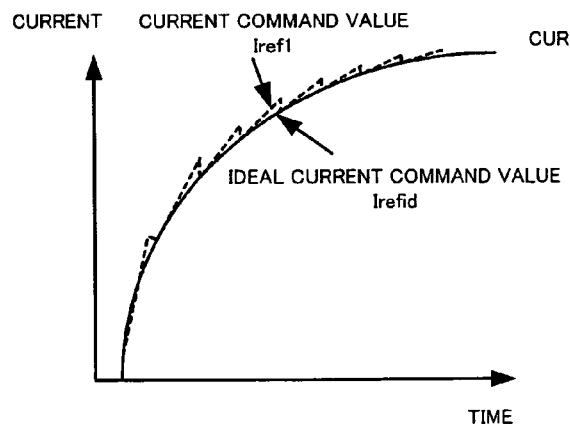
(C)
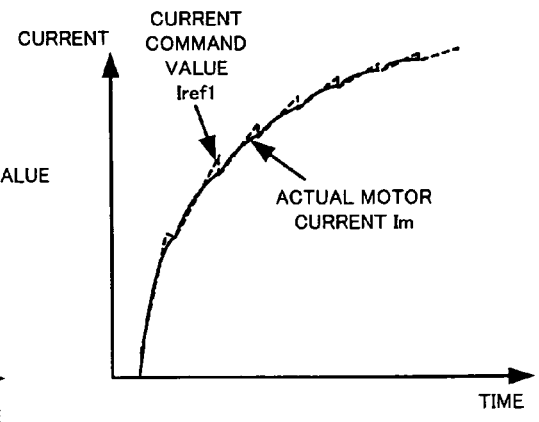
(D)

MOTOR DRIVING DEVICE AND ELECTRIC POWER STEERING APPARATUS

TECHNICAL FIELD

The present invention relates to a motor driving device, and more particularly, relates to a motor driving device which drives a motor having a winding wire with small inductance value based on a digitized current command value and an electric power steering apparatus using the motor driving device.

BACKGROUND TECHNIQUE

Electric power steering apparatus, which gives assist power by means of auxiliary force of motors in order to enable smooth operation of steering wheel in automobile, is often used. The electric power steering apparatus gives drive power of motor as assist power to steering shaft or rack shaft using transmission mechanisms such as gear or belt via reduction gears. FIG. 1 illustrates a simple construction of such an electric power steering apparatus. A shaft 202 of a steering wheel 201 is jointed to a tie rod 206 of a front wheel via a reduction gear 203, universal joints 204a and 204b and a pinion rack mechanism 205. The shaft 202 is provided with a torque sensor 207 that detects steering torque of the steering wheel 201, and a motor 208 that assists the steering power of the steering wheel 201 is connected to the shaft 202 via the reduction gear 203.

FIG. 2 illustrates one example of control of motor drive to be used in such an electric power steering apparatus.

In the control of the motor drive, generally, an analog signal detected by a sensor is converted into a digital signal, and digitally controlled by a digital controller such as a microcomputer. In FIG. 2, a torque T detected by a torque sensor 207 and a vehicle speed V detected by a speed sensor, not shown, are converted into digital values, and the digital values are inputted into a current command value calculating unit 10 as a current command value calculating means so that a current command value Iref is calculated. In this case, the current command value Iref calculated by the current command value calculating unit 10 is zero-order-held by a zero-order hold circuit 14 as a zero-order hold means, so that a current command value Iref0 is output. The zero-order hold circuit 14 and its problem are explained in detail later.

A subtracting unit 20 calculates a difference ΔI between an actual motor current Im detected by a current detecting circuit 28 and the current command value Iref0. A current control means such as a current control unit 22 is used to control so that the difference ΔI is eliminated. A voltage command value Vref as an output from the current control unit 22 is inputted into a PWM control unit 24 as a PWM control means, and the PWM control unit 24 outputs a PWM signal to an inverter circuit 26 as one example of a motor driving circuit which supplies a current to the motor 208.

As shown in FIG. 2, a portion which is surrounded by a broken line A including the current command value calculating unit 10 through the PWM control unit 24 is comprised of a digital control means such as a microcomputer. That is to say, at least, the digital control means is comprised of a plurality of control means such as the current command value calculating means, the current control means and the PWM control means.

The motor 208 is PWM-driven based on the PWM signal, and a motor current Im is supplied from an inverter circuit 26 to the motor 208 so that the inverter circuit 26 conforms to the current command value Iref0.

As mentioned above, since the motor drive of the electric power steering apparatus is digitally controlled by the digital control means such as microcomputer, the motor is controlled by the current command value Iref0 which is zero-order-held. Examples of sampling periods of the current command value calculating unit 10 and the current control unit 22 are, for example, 2 ms and 1 ms, respectively, and thus they are different from each other. Further, the current command value Iref0, which is obtained by zero-order-holding the current command value Iref calculated by the current command value calculating unit 10 using the zero-order hold circuit 14, becomes a current command value which changes in a staircase pattern.

FIG. 3 illustrates one example of the current command value Iref0 which is zero-order-held. As shown in FIG. 3, even if the motor is controlled based on the current command value Iref0 having a staircase waveform, the motor cannot be energized by a motor current causing an abrupt change because conventionally the inductance value of the winding wire of the motor is comparatively large. As a result, the corner of the staircase-pattern current waveform is rounded off and smooth motor current is obtained.

Due to the reason explained below, in recent years, the inductance value of the winding wires of the motors used for the electric power steering apparatus becomes smaller, and accordingly the problem, mentioned later, arises.

In recent years, the high power and high efficiency electric power steering apparatus is required. However, a power source voltage of a vehicle is 12V, it is difficult to heighten a voltage for high output and high efficiency. In motors itself which are applied to electric power steering apparatus, the inductance value of winding wires tend to be small in order to heighten output and efficiency.

As a result, as shown in FIG. 4, since the inductance value of a winding wire of a motor is small with respect to the current command value Iref0 of staircase pattern which is zero-order-held, a waveform of the motor current Im to energize the motor also becomes a staircase-patterned waveform according to the waveform of the current command value Iref0. The actual motor current Im having the staircase-patterned current waveform includes many higher harmonic waves, and the higher harmonic wave causes noises. In other words, a quantization error in the digital control causes higher harmonic wave included in the actual motor current Im, thereby causing the problem of noise.

The inductance value of the winding wire of the motor becomes small, and further, in the electric power steering apparatus, a small-sized brushless DC motor with high output and rectangular wave current tends to be used increasingly in recent years. The rectangular wave current includes a portion where di/dt is large, and a quantization error obviously appears in the current portion with large di/dt. In the case, therefore, where the motor is driven by the rectangular wave current, the quantization error in the current portion of the rectangular wave current with large di/dt also causes an increase in higher harmonic waves, thereby causing the increase in noise.

In the electric power steering apparatus, since a battery voltage is 12V, namely low, when the output is tried to be increased, the current becomes high, and it is necessary to flow the current of maximally about 100 A. In order to supply high current, therefore, di/dt of the motor current becomes large as a result, and thus the above-mentioned problem is increased.

Here, there is a Patent Document (Japanese Patent Application Laid-Open No. 2000-018069), which treats the problem similar to that the sampling periods of the respective control means in the digital control means are different. However, Japanese Patent Application Laid-Open No. 2000-018069, does not refer to an electric power steering apparatus but refers to a throttle valve control unit for automobile. FIG. 5 illustrates a control block diagram of the throttle valve control unit for automobile disclosed in Japanese Patent Application Laid-Open No. 2000-018069. As shown in FIG. 5, feedback control is performed by a throttle opening signal as a feedback signal from an opening sensor 303 so that a check is made whether a motor 308 for opening a valve operates according to an opening command of the throttle valve.

Construction of the control block is as follows. The opening command is inputted into an opening control unit 301 comprised of a low-speed microcomputer via an interface 302, and a throttle opening signal detected by the opening sensor 303 is inputted into the opening control unit 301 via an operational amplifier 304. A current command calculated by the opening control unit 301 based on these input values and forward/reverse rotation signal are output. The forward/reverse rotation signal is inputted directly to a chopper 307 composed of an H bridge. Meanwhile, the current command is inputted into a current control unit 305 composed of an analog circuit via a filter 306. The current control unit 305 outputs a PWM signal which is calculated based on the current command via the filter 306 and a current (current detection signal) detected by a resistance 309 for detecting current, and the chopper 307 is controlled based on the PWM signal so that the current is supplied from the chopper 307 to the motor 308.

The opening control unit 301 is composed of a digital circuit of the low-speed microcomputer, and the current control unit 305 is composed of a high-speed analog circuit. This is because although the current control unit should perform an operation at high speed, the microcomputer which can calculates at high speed is expensive. For this reason, the opening control unit 301 is composed of the inexpensive low-speed microcomputer, whereas the current control unit 305 which requires high-speed operation is composed of the inexpensive high-speed analog circuit so that the high-speed control can be made inexpensively in the entire device. Since it is not, however, preferable that the digital signal is inputted directly into the analog circuit, it is inputted via the filter 306 as a low-pass filter composed of a capacitor and a resistance.

In the throttle valve control device for automobile disclosed in Japanese Patent Application Laid-Open No. 2000-018069, even if a simple low-pass filter is used, a phase delay is large, and thus a high-speed response cannot be realized in an entire control system. Further, this publication does not refer to the problem relating to the motor where the inductance value of the winding wire is small, and namely, does not disclose any solving means in the case where a motor driving device using the motor with winding wire of small inductance value and an electric power steering apparatus having such a motor driving device are controlled digitally.

As mentioned above, in the motor driving device where the motor having the winding wire of small inductance value is controlled by a digital control means comprised of a plurality of control means such as a current command value calculating means, a current control means and a PWM control means whose sampling periods are different, when the current command value Iref calculated by the current command value calculating means is zero-order-held, the zero-order-held current command value Iref0 has a staircase pattern waveform, and thus also the waveform of a current to energize the winding wire of the motor is similar to the staircase waveform of the current command value Iref0. The staircase-pattern current waveform of the motor current Im includes a lot of higher harmonic wave components, and the higher harmonic wave current causes noise. Further, also in the electric power steering apparatus having the motor driving device, the noise makes a driver and/or passengers uncomfortable.

The present invention is made to solve the above problem, and its object is to provide a motor driving device in which a motor having a winding wire of small inductance value is controlled by a digital control means comprised of a plurality of control means such as a current command value calculating means, a current control means and a PWM control means whose sampling periods are different, and which reduces a quantization error so as to suppress higher harmonic wave (higher harmonic wave components) of a motor current and reduces motor noise, and to provide an electric power steering apparatus having the motor driving device.

DISCLOSURE OF THE INVENTION

The present invention relates to a motor driving device comprised of a motor and a digital control means which at least has a current command value calculating means, a current control means and a PWM control means PWM-controlling a motor driving circuit for supplying a current to said motor as its components. An object of the present invention is effectively achieved by providing an n-th-order hold means (n is a natural number) between said components of said digital control means whose sampling periods are different from each other.

Further, the object of the present invention is effectively achieved by providing said n-th-order hold means between said current command value calculating means and said current control means, or by providing said n-th-order hold means between said current control means and said PWM control means, or by that said n-th-order hold means is any one of a hold means using a n-th-order equation; a hold means that allows an error to fit a n-th-order equation by least squares method so as to be minimum; a first-order hold means where $G(s)=T^{-}\cdot(1+T\cdot s)[(1-\exp(-T\cdot s))/(T\cdot s)]^2$ (where, T is a sampling period) is used as a transfer function; and a first-order hold means in which $u(t)=u(k)+[(t-k\cdot Ts)/Ts][u(k+1)-u(k)]$ (where, $k\cdot Ts < t < (k+1)\cdot Ts$ holds, and Ts is a sampling period) is used as a transfer function.

Further, the object of the present invention is effectively achieved by that a microcomputer is used as said digital control means, or an inductance value of a winding wire of said motor is 100 μH or less, or said motor is a brushless DC motor, or an energizing current of said motor is a rectangular wave current.

Further, the present invention refers to an electric power steering apparatus which has a motor driving device comprising a motor having a wiring wire with small inductance value, and a digital control means at least having a current command value calculating means, a current control means and a PWM control means PWM-controlling a motor driving circuit for supplying a current to said motor. The object of the present invention is effectively achieved by providing said motor driving device of the present invention.

BRIEF DESCRIPTION OF THE DRAWINGS

FIG. 11 is a diagram illustrating a comparison of a result of the first-order-held current command value of the present invention with a result of the zero-order-held current command value in the conventional art;

BEST MODE FOR CARRYING OUT THE INVENTION

A basic concept to realizes the present invention is that in a motor driving device in which a motor having a winding wire with small inductance value is controlled by digital control means such as a microcomputer, when sampling periods of respective control means which are components of the digital control means such as a current command value calculating means, a current control means and a PWM control means are different from each other, n-th-order hold means (n is a natural number) is provided between the respective control means.

For example, when the n-th-order hold means is provided between the current command value calculating means and the current control means having different sampling periods, the n-th-order hold means n-th-order-holds a current command value Iref calculated and determined by the current command value calculating means so as to obtain a current command value Irefn, so that the quantization error can be reduced. As a result, the higher harmonic wave of the motor current can be suppressed, and thus the motor noise can be reduced.

Further, when the n-th-order hold means is provided between the current control means and the PWM control means having different sampling periods, the n-th-order hold means n-th-order-holds a voltage command value Vref as an output from the current control means so as to obtain a voltage command value Vrefn. As a result, the quantization error can be reduced, and thus the higher harmonic wave of the motor current can be suppressed, thereby reducing the motor noise.

Preferred embodiments of the present invention are explained in detail below with reference to the drawings.

[Embodiment 1]

Figure 6:
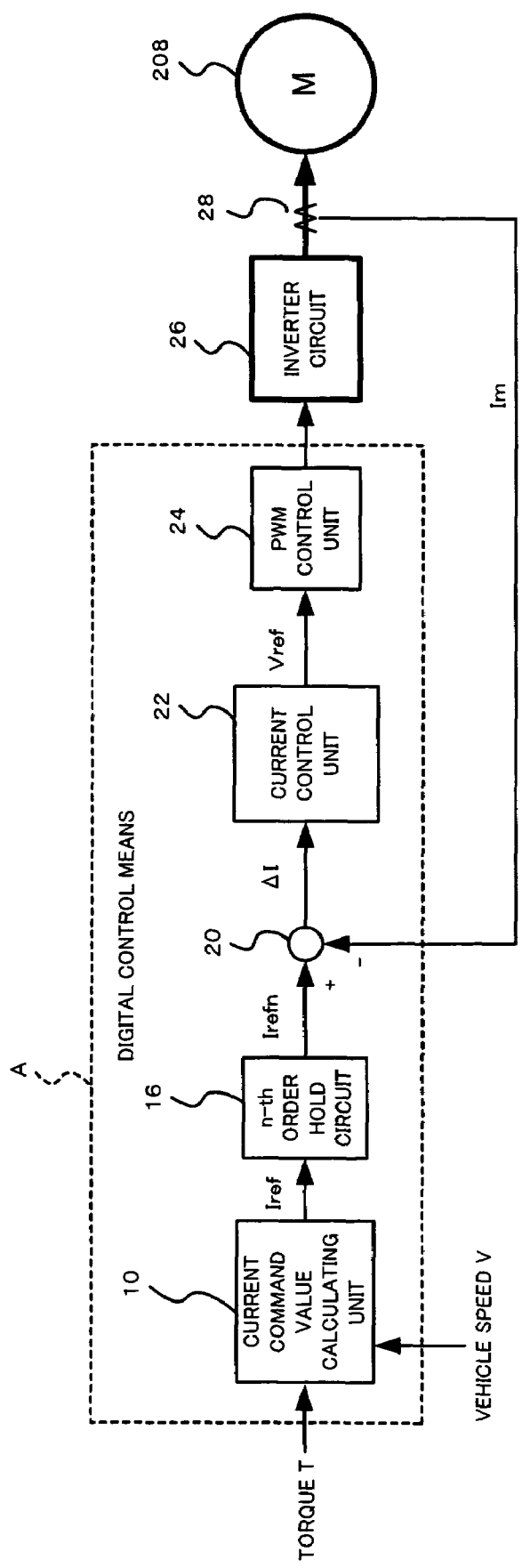
FIG. 6 is a control block diagram of a motor driving device using n-th-order hold means according to the present invention.

FIG. 6 is a control block diagram illustrating embodiment 1 of the motor driving device according to the present invention. As shown in FIG. 6, an n-th-order hold circuit 16 as the n-th-order hold means is provided at later part of a current command value calculating unit 10 as the current command value calculating means.

In FIG. 6, first, the current command value calculating unit 10 as the current command value calculating means calculates a current command value Iref by using a vehicle speed V and a torque T as its inputs, and the current command value Iref is output from the current command value calculating unit 10 to the n-th-order hold circuit 16 as the n-th-order hold means. Next, the current command value Iref is n-th-order-held by the n-th-order hold circuit 16 and is output as a current command value Irefn from the n-th-order hold circuit 16 so as to be inputted into a subtracting unit 20.

On the other hand, a motor current Im detected by a current detecting circuit 28 is also fed back to the subtracting unit 20, and the subtracting unit 20 calculates a difference ΔI between the current command value Irefn and the motor current Im. The difference ΔI is inputted into a current control unit 22 as the current control means, and the current control unit 22 performs a control so that the difference ΔI is eliminated, namely, the actual motor current Im becomes equal to the current command value Irefn.

A voltage command value Vref as an output from the current control unit 22 is inputted into a PWM control unit 24 as the PWM control means, and the PWM control unit 24 outputs a PWM signal to an inverter circuit 26 as a specific example of the motor driving circuit for supplying a current to a motor 208. A portion including the current command value calculating unit 10 through the PWM control unit 24 surrounded by a broken line A is comprised of digital control means such as a microcomputer.

The motor 208 is PWM-driven based on the PWM signal output from the PWM control unit 24, and the inverter circuit 26 supplied the motor current Im to the motor 208 to be equal to the current command value Irefn.

The above is the explanation relating to the construction of the motor driving device of embodiment 1. Here, the important matter is that since the sampling periods of the current command value calculating unit 10 and the current control unit 22 are, for example, 2 ms and 1 ms, namely, different, the n-th-order hold circuit 16 as the n-th-order hold means which is the point of the present invention is provided between the current command value calculating unit 10 and the current control unit 22.

The n-th-order hold circuit 16 as the n-th-order hold means is, therefore, explained in detail below.

First, a zero-order hold circuit of the conventional case can be expressed by a transfer function represented by the following expression 1.

$$G(s)=(1-\exp(-s \cdot T))/s \qquad \text{[Expression 1]}$$

Where, G(s) is the transfer function of the zero-order hold circuit, and T is the sampling period.

Meanwhile, in the case of the n-th-order hold circuit 16 (n is a natural number) used in the present invention, for example, when n=1, namely, the first-order hold circuit can be expressed by a transfer function represented by the following expression 2.

$$G(s)=T^{-1} \cdot (1+T \cdot s)[(1-\exp(-T \cdot s))/(T \cdot s)]^2 \qquad \text{[Expression 2]}$$

Where, G(s) is the transfer function of the first-order hold circuit, and T is the sampling period. That is to say, the first-order hold circuit using the transfer function represented by expression 2 is a hold circuit in which a value of tilt between one previous time points holds from a certain time point to the next time point.

The transfer function of the first-order hold circuit is not limited to expression 2, and thus, for example, a transfer function expressed by the following expression 3 can be used.

The mechanism of the first-order hold (FOH) using the transfer function represented by expression 3 is different from the mechanism of the above-mentioned zero-order hold (ZOH). In order to convert a sampled discrete time signal u(k) into a continuous time signal u(t), namely, the input of the first-order hold circuit is the sampled discrete time signal u(k) and the output from the first-order hold circuit is the continuous time signal u(t), the first-order hold (FOH) uses linear interpolation expressed by the following expression 3 between the sampling points, namely, between the discrete time signals u(k).

$$u(t)=u(k)+[(t-k \cdot Ts)/Ts](u(k+1)-u(k)) \qquad \text{[Expression 3]}$$

Where, k·Ts<t<(k+1)·Ts holds, and Ts is the sampling period. u(k) is the sampled discrete time signal to be the input to the first-order hold circuit, and u(t) is the continuous time signal to be the output from the first-order hold circuit.

The first-order hold using the transfer function expressed by expression 3 is called also as triangular approximation or ramp-invariant approximation.

As to the n-th-order hold circuit 16 as the n-th-order hold means which is the point of the present invention, when n=1, namely, in the case of the first-order hold circuit, the two transfer functions to be used in the first hold circuit are explained above, but the transfer function to be used in the n-th-order hold circuit 16 of the present invention is explained as follows.

The n-th-order hold by means of the n-th-order hold means in the present invention is a hold using a n-th-order equation. That is to say, n-th-order hold of the present invention means that the n-th-order equation is generated based on past (n+1) samples to be the input to the n-th-order hold circuit 16 as the n-th-order hold means, namely, based on the (n+1) sampled discrete time signals, an interpolation value is predicted, and the continuous time signal to be the output from the n-th-order hold circuit 16 is generated.

Figure 7:
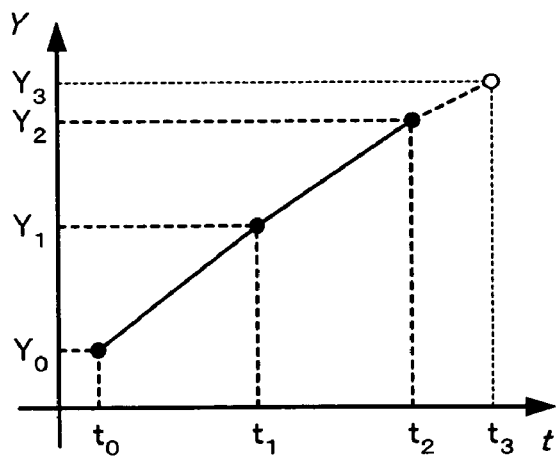
FIG. 7 is a pattern diagram for explaining a transfer function to be used for n-th-order hold using a n-th-order equation according to the present invention.

As to the n-th-order hold circuit 16 as the n-th-order hold means, when n=2, for example, as shown in FIG. 7, a quadratic expression expressed by the following expression 4 is generated based on past three samples ($Y_0$, $Y_1$, and $Y_2$), so that an interpolation value $Y_3$ is predicted.

$$Y=at^2+bt+c \qquad \text{[Expression 4]}$$

Here, a simultaneous equation for obtaining coefficients a, b and c of the quadratic expression presented by expression 4 becomes the following expression 5.

$$\begin{pmatrix} t_0^2 & t_0 & 1 \\ t_1^2 & t_1 & 1 \\ t_2^2 & t_2 & 1 \end{pmatrix} \begin{pmatrix} a \\ b \\ c \end{pmatrix} = \begin{pmatrix} Y_0 \\ Y_1 \\ Y_2 \end{pmatrix} \qquad \text{[Expression 5]}$$

Therefore, the quadratic expression for obtaining the interpolation value $Y_3$ becomes the following expression 6.

$$Y_3 = at_3^2 + bt_3 + c = (t_3^2 \; t_3 \; 1) \begin{pmatrix} t_0^2 & t_0 & 1 \\ t_1^2 & t_1 & 1 \\ t_2^2 & t_2 & 1 \end{pmatrix}^{-1} \begin{pmatrix} Y_0 \\ Y_1 \\ Y_2 \end{pmatrix} \qquad \text{[Expression 6]}$$

In the actual calculation, an inverse matrix portion of the expression 6 can be previously calculated. As an example, a control portion input value of the sampling period T is obtained based on a control portion output value of the sampling period 2T. As a result, based on three samples of the past values ($Y_0$, $Y_1$ and $Y_2$) and the quadratic expression, the respective coefficients are obtained as shown in the following expression 7.

$$Y_3 = (0.375 \; -1.25 \; 1.875) \begin{pmatrix} Y_0 \\ Y_1 \\ Y_2 \end{pmatrix} \qquad \text{[Expression 7]}$$

Furthermore, as a result, for example, based on two samples of the past values ($Y_0$ and $Y_1$) and the linear expression, the respective coefficients are obtained as shown in the following expression 8.

$$Y_2 = (-0.5 \; 1.5) \begin{pmatrix} Y_0 \\ Y_1 \end{pmatrix} \qquad \text{[Expression 8]}$$

For example, based on four samples of the past values ($Y_0$, $Y_1$, $Y_2$ and $Y_3$) and a third-order expression, the respective coefficients are obtained as shown the following expression 9.

$$Y_4 = (-0.3125 \; 1.3125 \; -2.1875 \; 2.1875) \begin{pmatrix} Y_0 \\ Y_1 \\ Y_2 \\ Y_3 \end{pmatrix} \qquad \text{[Expression 9]}$$

For example, based on five samples of the past values ($Y_0$, $Y_1$, $Y_2$, $Y_3$ and $Y_4$) and a fourth-order expression, the respective coefficients are obtained as shown in the following expression 10.

$$Y_5 = \begin{pmatrix} 0.2734 & -1.4062 & 2.9531 & -3.2812 & 2.4609 \end{pmatrix} \begin{pmatrix} Y_0 \\ Y_1 \\ Y_2 \\ Y_3 \\ Y_4 \end{pmatrix}$$ [Expression 10]

Figure 8:
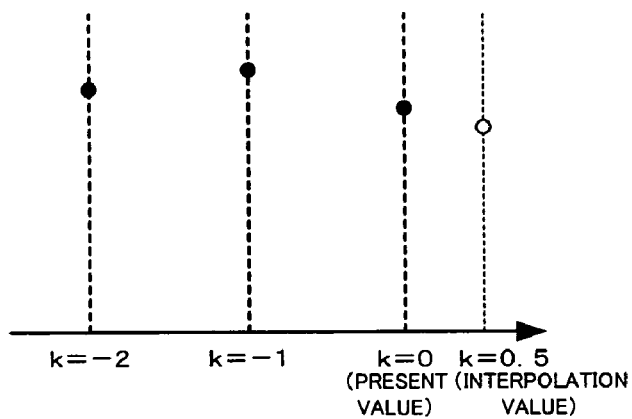
FIG. 8 is a pattern diagram for explaining a transfer function to be used for second-order hold using a quadratic expression of the present invention.

In more concrete explanation, the transfer function to be used in the n-th-order hold using the expression in degree n, for example, as shown in FIG. 8, to be used in the second-order hold, can be expressed by the following expression 11.

$$y[k] = ak^2 + bk + c$$ [Expression 11]

Here, value of y[0.5] (i.e. value of y when k=0.5) is obtained. When the coefficients a, b and c are expressed by last but one value y[−2], previous value y[−1] and present value y[0], the following expressions 12, 13 and 14 hold.

$$y[0] = c$$ [Expression 12]

$$y[-1] = a - b + c$$ [Expression 13]

$$y[-2] = 4a - 2b + c$$ [Expression 14]

The following expression 15 holds according to expressions 12 and 13.

$$a - b = y[-1] - c = y[-1] - y[0]$$ [Expression 15]

Similarly, the following expression 16 holds according to expression 14.

$$4a - 2b = y[-2] - y[0]$$ [Expression 16]

The following expression 17 holds according to expressions 12, 15 and 16.

$$a = \frac{y[-2] - 2y[-1] + y[0]}{2}$$

$$b = \frac{y[-2] - 4y[-1] + 3y[0]}{2}$$

$$c = y[0]$$

When y[0.5] is calculated by using expression 17, the following expression 18 holds.

$$y[0.5] = \frac{15y[0] - 10y[-1] + 3y[-2]}{8}$$ [Expression 18]

When expression 18 is expressed by using $z^{-1}$ or the like, the following expression 19 holds.

$$y\left[k + \frac{1}{2}\right] = \frac{15 - 10z^{-1} + 3z^{-2}}{8} y[k]$$ [Expression 19]

The above explains one specific embodiment of the n-th-order hold according to the present invention, namely, the n-th-order hold using the n-th-order equation, but the n-th-order hold of the present invention is not limited to this. An error of the past sample values may be allowed to fit the n-th-order equation by, for example, least squares method based on the past sample (for example, like embodiment 2 mentioned later, the voltage command value to be the input of the n-th-order hold circuit provided between the current control unit 22 and the PWM control unit 24) o be an input signal of the n-th-order hold circuit as the n-th-order hold means so as to be minimum.

Figure 9:
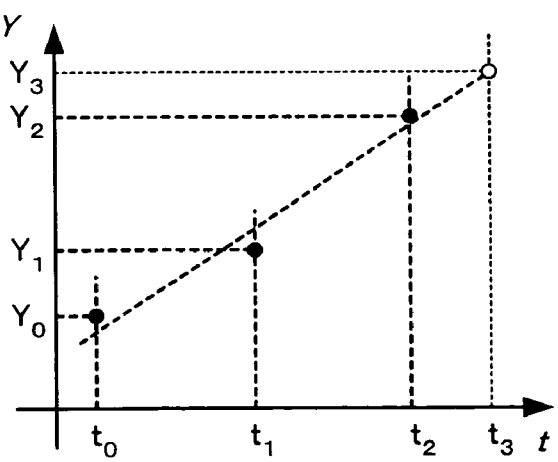
FIG. 9 is a pattern diagram for explaining a transfer function to be used for n-th-order holding for allowing an error of past sampled values to fit the n-th-order equation so as to be minimum by least squares method according to the present invention.

Specifically, for example, as shown in FIG. 9, the linear expression is generated by least squares method based on the past three samples, so that the interpolation value is predicted. In other words, the respective coefficients of the linear expression expressed by the following expression 20 are calculated by least squares method.

$$Y = at + b$$ [Expression 20]

Here, a simultaneous equation for obtaining the coefficients a and b in expression 20 can be expressed by the following expression 21.

$$\begin{pmatrix} \sum t_i^2 & \sum t_i \\ \sum t_i & \sum 1 \end{pmatrix} \begin{pmatrix} a \\ b \end{pmatrix} = \begin{pmatrix} \sum t_i Y_i \\ \sum Y_i \end{pmatrix}$$ [Expression 21]

Therefore, the linear expression for obtaining the interpolation $Y_3$ based on the past three samples can be expressed by the following expression 22.

$$Y_3 = at_3 + b = \begin{pmatrix} t_3 & 1 \end{pmatrix} \begin{pmatrix} \sum t_i^2 & \sum t_i \\ \sum t_i & \sum 1 \end{pmatrix}^{-1} \begin{pmatrix} \sum t_i Y_i \\ \sum Y_i \end{pmatrix}$$ [Expression 22]

In actual calculation, an inverse matrix portion of expression 22 can be previously calculated. As a result, based on three samples of past values and the linear expression, the respective coefficients are obtained as shown in the following expression 23.

$$Y = \begin{pmatrix} 0.75 & -0.4167 \end{pmatrix} \begin{pmatrix} \sum t_i Y_i \\ \sum Y_i \end{pmatrix} cf \cdot \begin{cases} \sum t_i Y_i = Y_1 + 2Y_2 \\ \sum Y_i = Y_0 + Y_1 + Y_2 \end{cases}$$ [Expression 23]

Furthermore, as a result, for example, based on four samples of past values and the quadratic expression, the respective coefficients are obtained as shown in the following expression 24.

$$Y = \begin{pmatrix} 0.6875 & -1.6625 & 0.3375 \end{pmatrix} \begin{pmatrix} \sum t_i^2 Y_i \\ \sum t_i Y_i \\ \sum Y_i \end{pmatrix} cf \cdot \begin{cases} \sum t_i^2 Y_i = Y_1 + 4Y_2 + 9Y_3 \\ \sum t_i Y_i = Y_1 + 2Y_2 + 3Y_3 \\ \sum Y_i = Y_0 + Y_1 + Y_2 + Y_3 \end{cases}$$ [Expression 24]

The above explains two specific embodiments of the n-th-order hold according to the present invention, but both the n-th-order hold using the n-th-order equation and the n-th-order hold for making the error of the past sample value fit the expression in degree n by least squares method so as to be minimum can be expressed by the following expression 25 in the case where the interpolation value is finally calculated based on, for example, four samples of past values. Therefore, calculation amount which is necessary for the n-th-order hold of the present invention is small (simply sum of products), and thus this is not a practical problem at all.

$$Y=\alpha_0 Y_0+\alpha_1 Y_1+\alpha_2 Y_2+\alpha_3 Y_3 \qquad \text{[Expression 25]}$$

Figure 1:
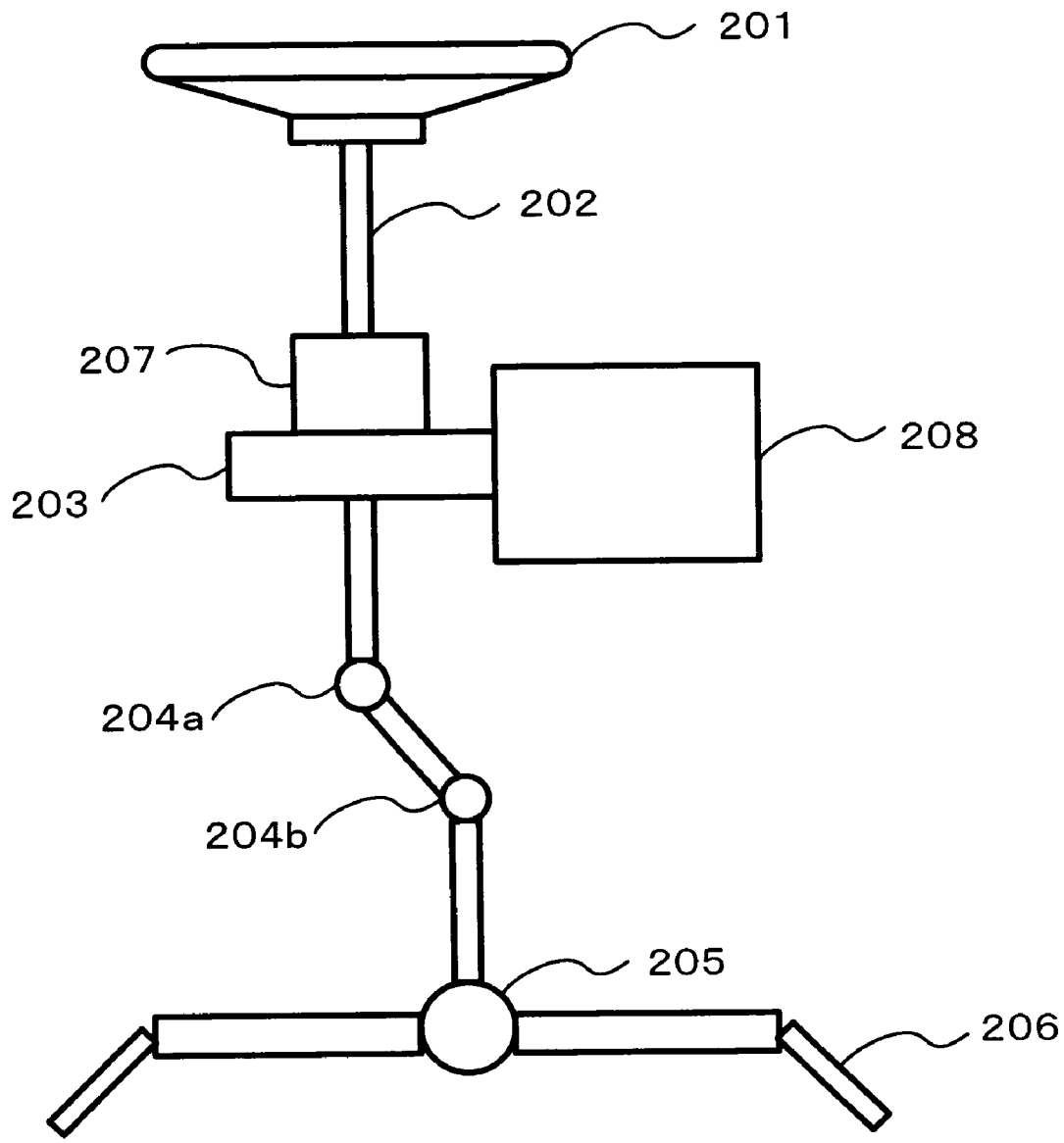
FIG. 1 is a diagram illustrating general construction of an electric power steering apparatus.
Figure 2:
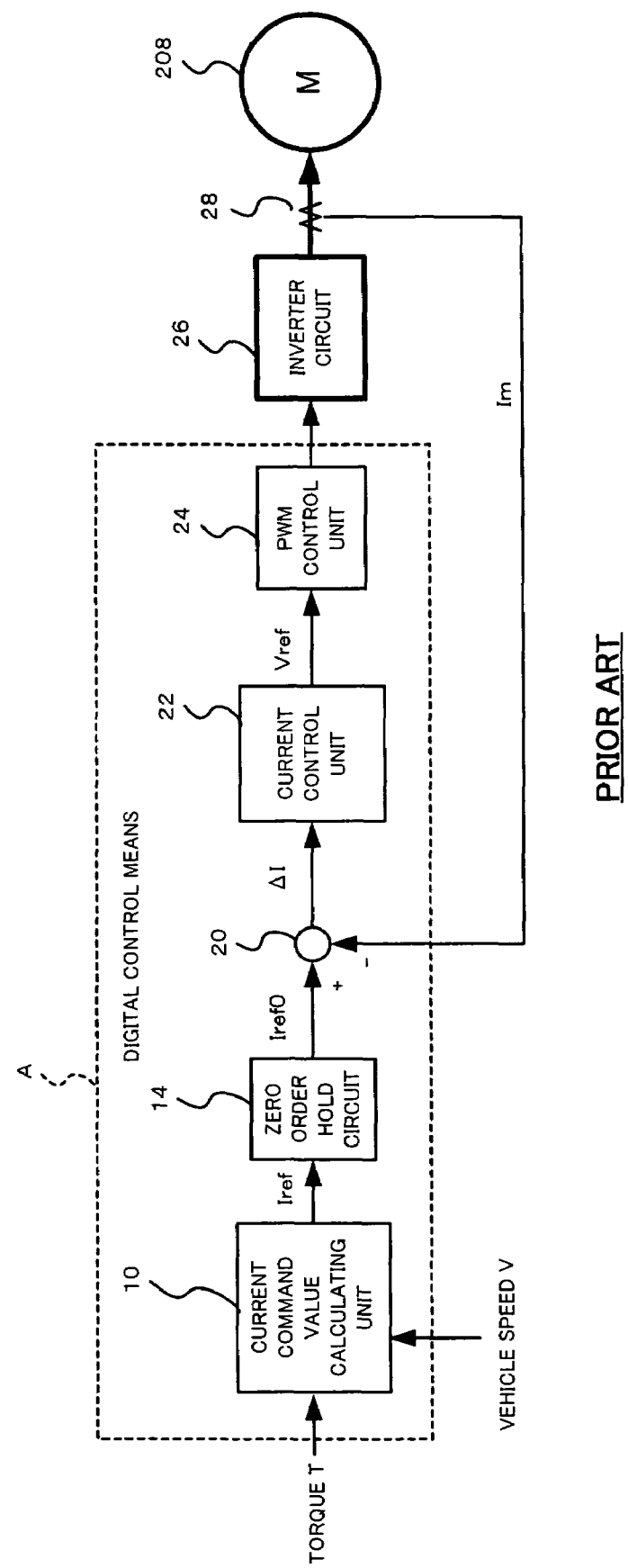
FIG. 2 is a control block diagram for driving a motor according to a current command value which is zero-order-held in a conventional art.
Figure 3:
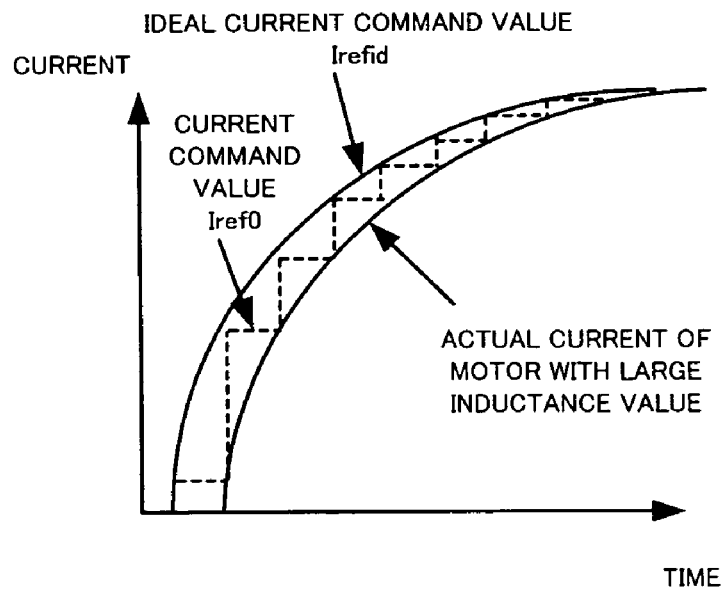
FIG. 3 is a diagram illustrating current waveform of a conventional motor which is controlled by zero-order-held current command value and has a winding wire with large inductance value.
Figure 4:
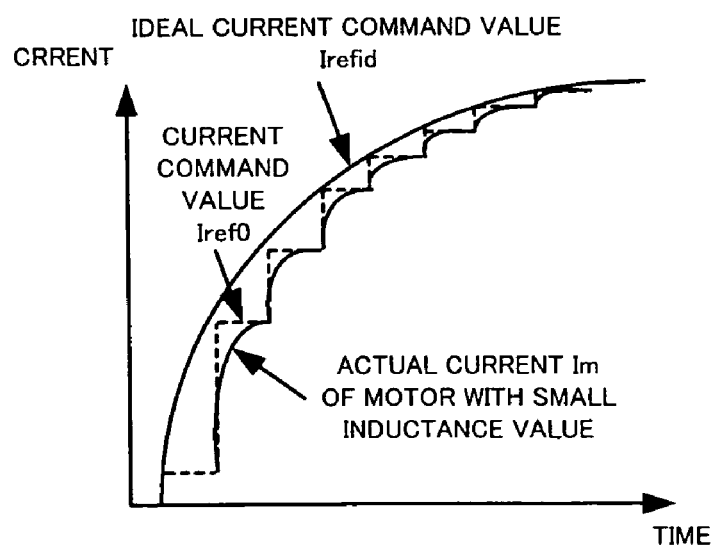
FIG. 4 is a diagram illustrating current waveform of a motor which is controlled by zero-order-held current command value and has a winding wire with small inductance value.
Figure 5:
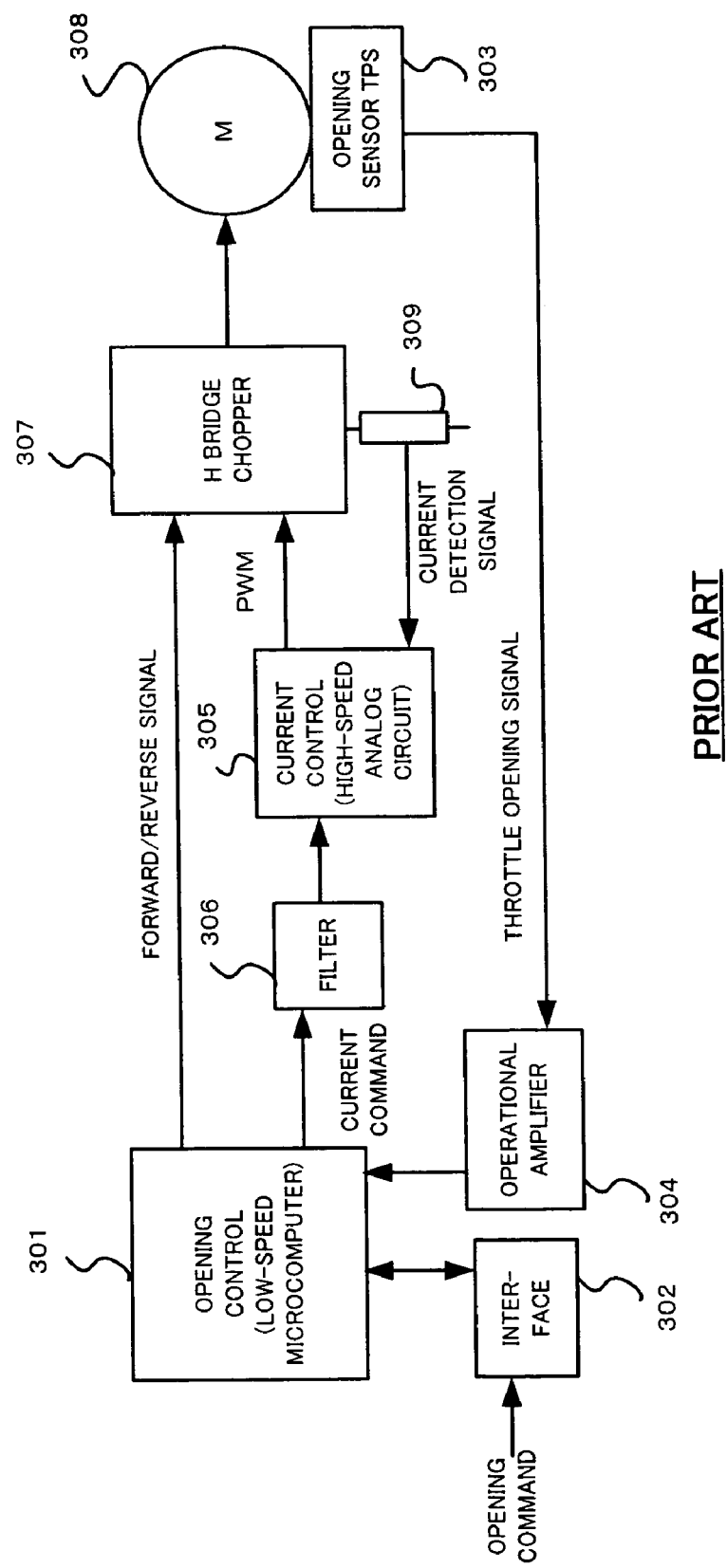
FIG. 5 is a control block diagram of a throttle valve control device for automobile having a hybrid construction where a digital control means and an analog control means are connected via a low-pass filter.
Figure 10:
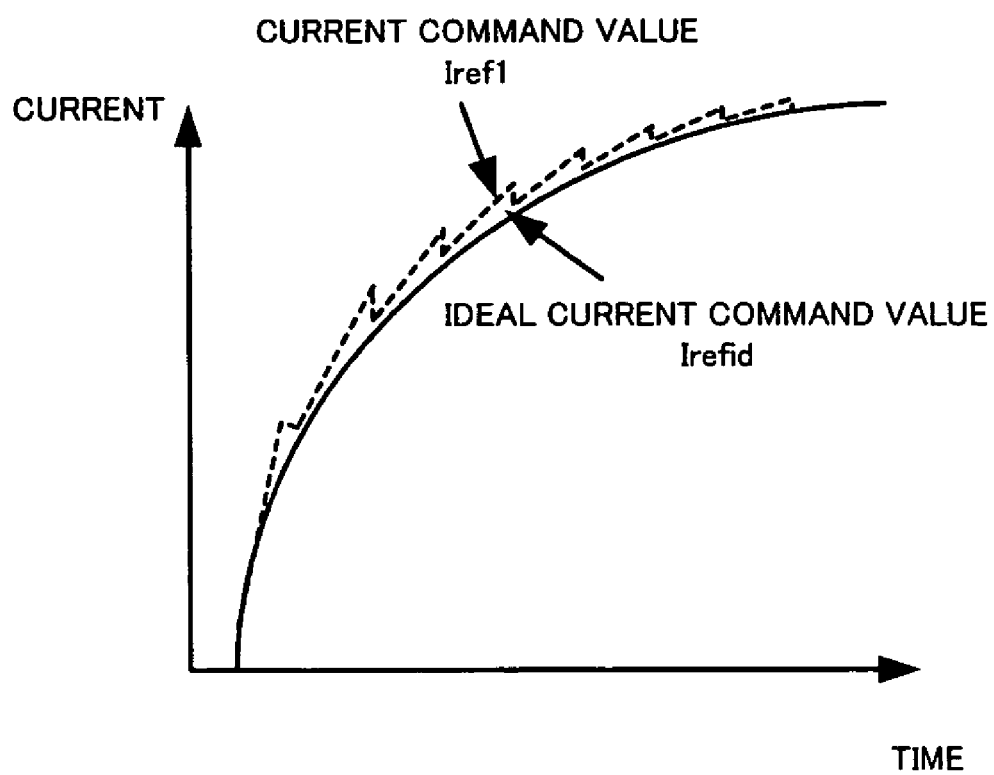
FIG. 10 is a diagram illustrating a current command value which is first-order-held by a first-order hold means of the present invention.

Here, FIG. 10 shows a current command value Iref1 as one example of the current command value Irefn (n=1) held by the n-th-order hold circuit 16 as the n-th hold means according to the present invention. The current command value Iref1 of FIG. 10 is compared with the current command value Iref0 of FIG. 4. As is clear, in the current command value Iref1 held by the first-order hold circuit of the present invention, the quantization error is less than that of the current command value Iref0 held by the conventional zero-order hold circuit 14, and the current command value Iref1 obtains a value which is closer to an ideal current command value Irefid.

In other words, the current command value Iref1 which is n-th-order-held by the n-th-order hold circuit 16 of the present invention, or the first-order hold circuit in the case of FIG. 10 is different from the conventional current command value Iref0 which is zero-order-held, and it is not a current command value with a staircase-patterned waveform but is a current command value with a smooth waveform whose corner is rounded off. Since the inductance value of the winding wire of the motor is small, the actual motor current Im becomes a current with rounded-off smooth waveform similarly to the current command value Iref1. The motor current Im with less higher harmonic wave components is, therefore, supplied from the inverter circuit 26 to the motor 208. As a result, the noise which is generated from the motor driven based on the first-order-held current command value Iref1 in the present invention is greatly lower than the noise which is generated from the motor driven based on the conventional zero-order-held current command value Iref0, and thus the noise problem is improved.

FIGS. 11A to 11D are diagrams where the waveform of the motor current controlled by the current command value Iref1 of the present invention is compared with the waveform of the motor current controlled by the conventional current command value Iref0. The motor current Im controlled by the conventional current command value Iref0 shown in FIG. 11A has a stair-patterned waveform similarly to the current command value Iref0 which is influenced by the quantization error as shown in FIG. 11B, and includes a lot of higher harmonic wave components. Meanwhile, the motor current Im which is controlled by the current command value Iref1 of the present invention shown in FIG. 11C has a current waveform which resembles that of the ideal current command value Irefid as shown in FIG. 11(D) and has less higher harmonic wave because the current command value Iref1 has a waveform which resembles that of the ideal current command value Irefid with less quantization error.

Particularly, in the motor which has the winding wire with a very small inductance value of not more than 100 µH, the waveform of the actual motor current Im is output as a waveform which is equal to the current command value. Therefore, when the present invention is applied to the motor having the winding wire with very small inductance value of not more than 100 µH, an excellent effect such that the motor current has less higher harmonic wave can be particularly expected because the n-th-order-held current command value (FIGS. 11C and 11D show examples of the first-order-held current command values Iref1) has less quantization error.

In the present invention, as the value n of the n-th-order hold means becomes larger, the held current command value can be closer to the ideal current command value Irefid. For example, the current command value Iref2 held by the second-order hold means can be closer to the ideal current command value Irefid than the current command value Iref1 held by the first-order hold means.

Figure 12:
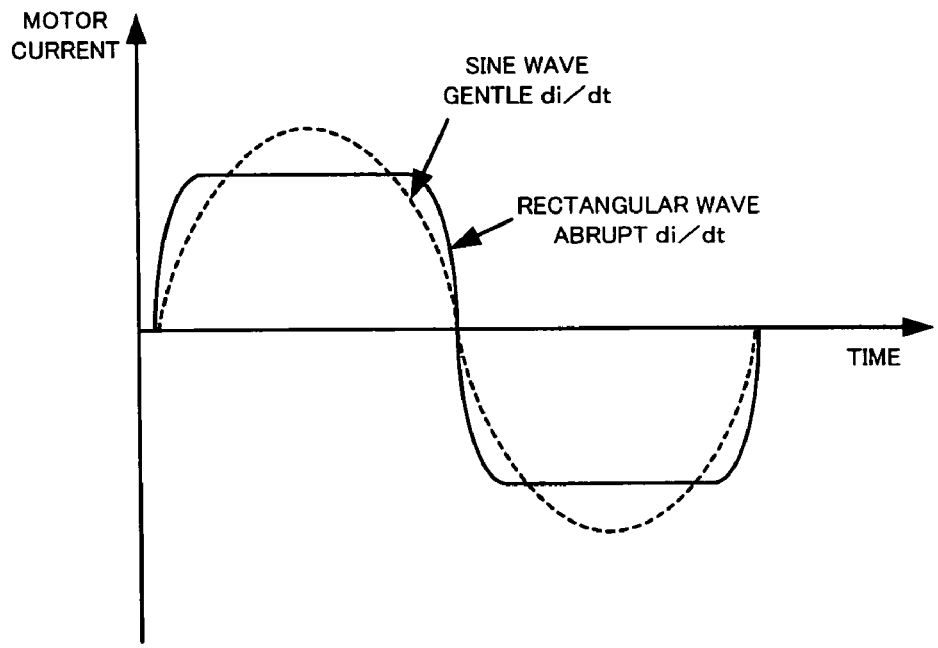
FIG. 12 is a diagram illustrating a difference between rectangular wave current control and sine wave current control relating to quantization error.

The case where a brushless DC motor of the present invention is driven by a rectangular wave current is explained below with reference to FIG. 12. The rectangular wave current has a portion where a change in the current, namely, di/dt is larger than a sine-wave current. When di/dt is large, the quantization error becomes large, and thus the higher harmonic wave of the motor current increases, thereby making the problem of noise apparent remarkably. Therefore, the n-th-order-held current command value in the present invention enables the quantization error to be reduced with respect to the motor control of the rectangular wave current and the motor current with less higher harmonic wave to be supplied. As a result, the noise can be reduced.

Figure 13:
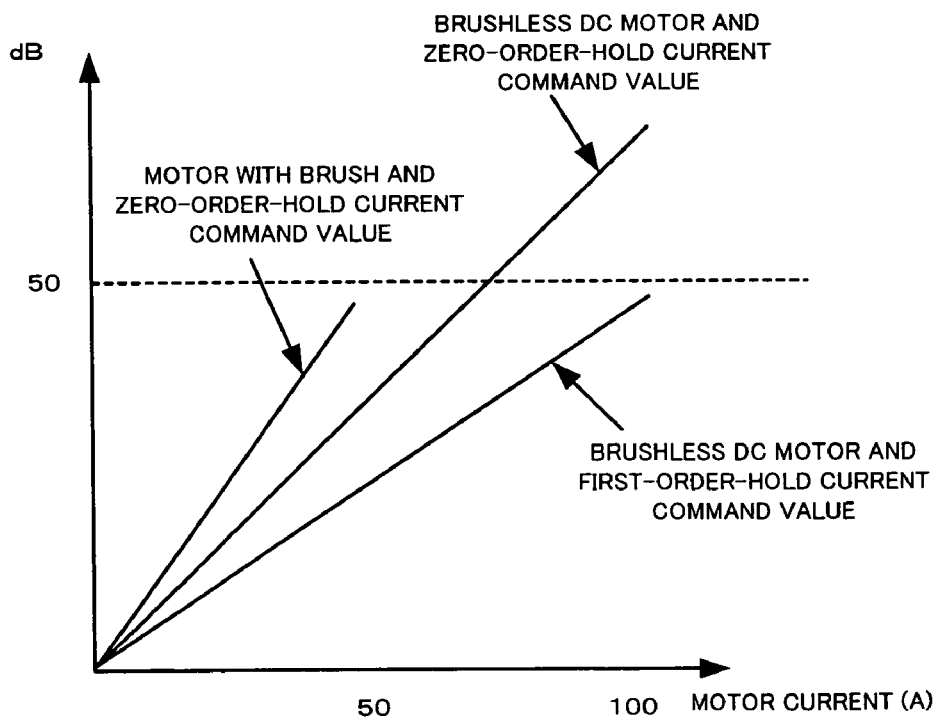
FIG. 13 is a diagram illustrating a difference between the effect of the zero-order-held current command value of the conventional art and the effect of the first-order-held current command value of the present invention as to noise of a brushless DC motor.

FIG. 13 is a diagram illustrating a relationship between a motor current and the noise in the cases where the brushless DC motor is driven by the conventional zero-order-held current command value Iref0 and by the first-order-held current command value Iref1 of the present invention and in the case where a motor with brush is driven by the conventional zero-order-held current command value Iref0. As is clear from FIG. 13, in the case of the motor with brush having small output, the noise does not become a problem because the energizing current is low even with the zero-order-held current command value Iref0. In the case of the brushless DC motor having larger output, however, the energizing current becomes high. For this reason, when the motor is driven by the conventional zero-order-held current command value Iref0, the noise exceeds 50 dB, for example, which becomes a problem.

With the use of the n-th-order hold means of the present invention, however, when the motor is driven by the current command value Iref1 first-order-held by the first-order hold means in the case of, for example, n=1, the noise does not become around 50 dB which is the problem until around 100 A which is the maximum current output value. For this reason, the excellent effect such that the noise does not become a problem can be obtained.

[Embodiment 2]

Figure 14:
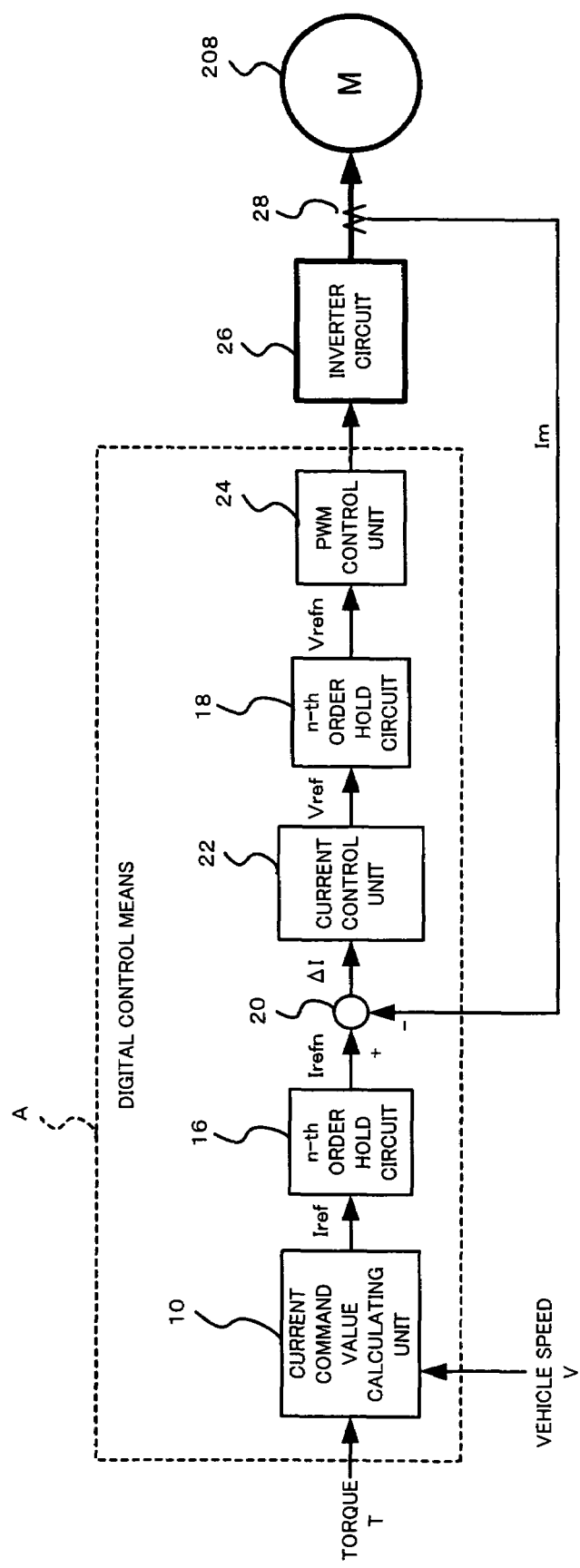
FIG. 14 is a control block diagram of a motor driving device in which two n-th-order hold means of the present invention are used.

Next, embodiment 2 in which three or more control means having different sampling periods are present is explained below with reference to FIG. 14. A difference between construction of embodiment 2 in FIG. 14 and construction of embodiment 1 in FIG. 6 is that besides the n-th-order hold circuit 16 provided between the current command value calculating unit 10 and the current control unit 22, an n-th-order hold circuit 18 as the n-th-order hold means is further provided between the current control unit 22 and the PWM control unit 24.

Here, for example, the sampling periods of the current command value calculating unit 10, the current control unit 22 and the PWM control unit 24 are 2 ms, 1 ms and 0.5 ms, respectively. In embodiment 1, the quantization error due to the difference in the sampling periods between the current command value calculating unit 10 and the current control unit 22 is eliminated by the n-th-order hold circuit 16. In embodiment 2, however, the quantization error due to the difference in the sampling periods between the current control unit 22 and the PWM control unit 24 is eliminated by the n-th-order hold circuit 18.

In embodiment 2 of the present invention, therefore, the two n-th-order hold means including the n-th-order hold circuit 16 and the n-th-order hold circuit 18 can obtain the motor current which is closer to the ideal current command value Irefid. The higher harmonic wave included in the motor current is further reduced, thereby greatly reducing the motor noise.

The n-th-order hold circuit 16 provided between the current command value calculating unit 10 and the current control unit 22, and the n-th-order hold circuit 18 provided between the current control unit 22 and the PWM control unit 24 does not have to have the same n value, or needless to say, may have the same n value. For example, the first-order hold circuit is provided between the current command value calculating unit 10 and the current control unit 22, and the second-order hold circuit may be provided between the current control unit 22 and the PWM control unit 24. The first-order hold circuit may be provided between the current command value calculating unit 10 and the current control unit 22, and the first-order hold circuit may be provided between the current control unit 22 and the PWM control unit 24.

The above explains the example of the n-th-order hold circuit between the control unit whose sampling periods are different from each other by double, but the present invention is not limited to this, and the n-th-order hold means (n-th-order hold circuit) can be provided between the control units whose sampling periods are different from each other by integral multiple similarly.

The above explanation refers to the example in the case where the control of the motor driving device is the feedback control, but even feed forward control can produce the same effect. Further, even the control which directly uses three-phase current or vector control where d and q conversion is performed can produce the similar effect.

That is to say, the effect of the present invention can be expected in the general motor driving device which digitally controls the motor driving, and the same effect can be expected particularly in the electric power steering apparatus which gives the driving power of the motor to the steering shaft or gives the assist power to the rack shaft.

INDUSTRIAL APPLICABILITY

According to the present invention, the n-th-order hold means is provided between the control means such as the current command value calculating means, the current control means and the PWM control means so as to perform the n-th-order hold. For this reason, when then n-th-order-held current command value Irefn is compared with the conventional zero-order-held current command value Iref0, the almost ideal current command value with less quantization error where a staircase-patterned change does not occur can be obtained. Therefore, when even the motor having the winding wire with small inductance value is driven based on the n-th-order-held current command value, the motor current does not become a staircase-patterned current, thereby providing the motor driving device in which the motor current has less higher harmonic wave components and the motor noise is not generated.

Further, the use of the electric power steering apparatus having such a motor driving device can produce the excellent effect such that the noise does not make a driver and/or passengers discomfortable.

What is claimed is:

1. A motor driving device comprised of a motor and a digital control means which at least has a current command value calculating means, a current control means and a PWM control means PWM-controlling a motor driving circuit for supplying a current to said motor as its components, and said components of said digital control means are connected in order of said current command value calculating means, said current control means, said PWM control means, said motor driving device is characterized in that an n-th-order hold means (n is a natural number) is provided between said components of said digital control means whose sampling periods are different from each other, said n-th-order hold means is a hold means using a n-th-order equation or a hold means that allows an error to fit a n-th-order equation by least squares method so as to be minimum.

2. The motor driving device according to claim 1, wherein said n-th-order hold means is provided between said current command value calculating means and said current control means.

3. The motor driving device according to claim 1, wherein said n-th-order hold means is provided between said current control means and said PWM control means.

4. The motor driving device according to claim 1, wherein said n-th-order hold means provided between said current command value calculating means and said current control means, and said n-th-order bold means is also provided between said current control means and said PWM control means.

5. The motor driving device according to claim 1, wherein a microcomputer is used as said digital control means.

6. The motor driving device according to claim 1, wherein an inductance value of a winding wire of said motor is 100 µH or less.

7. The motor driving device according to claim 1, wherein said motor is a brushless DC motor.

8. The motor driving device according to claim 1, wherein an energizing current of said motor is a rectangular wave current.

9. An electric power steering apparatus comprised of said motor driving device according to any one of claims 1 to 8.

10. A motor driving device comprised of a motor and a digital control means which at least has a current command value calculating means, a current control means and a PWM control means PWM-controlling a motor driving circuit for supplying a current to said motor as its components, and said components of said digital control means are connected in order of said current command value calculating means, said current control means, said PWM control means, said motor driving device is characterized in that a first-order hold means is provided between said components of said digital control means whose sampling period are different from each other, said first-order hold means is a first-order hold means in which $G(s) = T^{-1} \cdot (1+T \cdot s)[(1-\exp(-T \cdot s))/(T \cdot s)]^2$ (where, T is a sampling period) is used as a transfer function or a first-order hold means in which $u(t) = u(k) + [(t-k \cdot Ts)/Ts](u(k+1)-u(k))$ (where, $k \cdot Ts < t < (k+1) \cdot Ts$ holds, and Ts is a sampling period) is used as a transfer function.

11. The motor driving device according to claim 10, wherein said first-order hold means is provided between said current command value calculating means and said current control means.

12. The motor driving device according to claim 10, wherein said first-order hold means is provided between said current control means and said PWM control means.

13. The motor driving device according to claim 10, wherein said first-order hold means is provided between said current command
    value calculating means and said current control means, and said first-order hold means is also provided between said current control means and said PWM control means.

14. The motor driving device according to claim 10, wherein a microcomputer is used as said digital control means.

15. The motor driving device according to claim 10, wherein an inductance value of a winding wire of said motor is 100 µH or less.

16. The motor driving device according to claim 10, wherein said motor is a brushless DC motor.

17. The motor driving device according to claim 10, wherein an energizing current of said motor is a rectangular wave current.

18. An electric power steering apparatus comprised of said motor driving device according to any one of claims 10 to 17.

* * * * *